United States Patent
Hensenne

[15] 3,666,250
[45] May 30, 1972

[54] FURNACE AND METHOD OF MAKING SAME

[72] Inventor: Joseph F. Hensenne, Bonniers, Belgium
[73] Assignee: Elphiac, Brussels, Belgium
[22] Filed: Sept. 9, 1970
[21] Appl. No.: 70,865

[30] Foreign Application Priority Data

Sept. 11, 1969 Belgium....................................78956

[52] U.S. Cl...................................................263/46, 13/35
[51] Int. Cl.........................................................F23m 5/00
[58] Field of Search........................................263/46; 13/35

[56] References Cited

UNITED STATES PATENTS 3,401,226  9/1968  Renkey.................................263/46 X
1,445,860  2/1923  Turek....................................263/46 X Primary Examiner—John J. Camby
Attorney—Raymond A. Robic

[57] ABSTRACT

A furnace and a method of manufacturing such a furnace wherein a refractory concrete base is prepared at the bottom of a cylindrical tank, an induction coil is then placed over the base and thereafter puddled clay is packed inside the coil to form a crucible. The base is prepared separately in a removable bottom cover which is fixed to the cylindrical part and a further removable bottom cover is prepared for replacement purposes.

5 Claims, 1 Drawing Figure

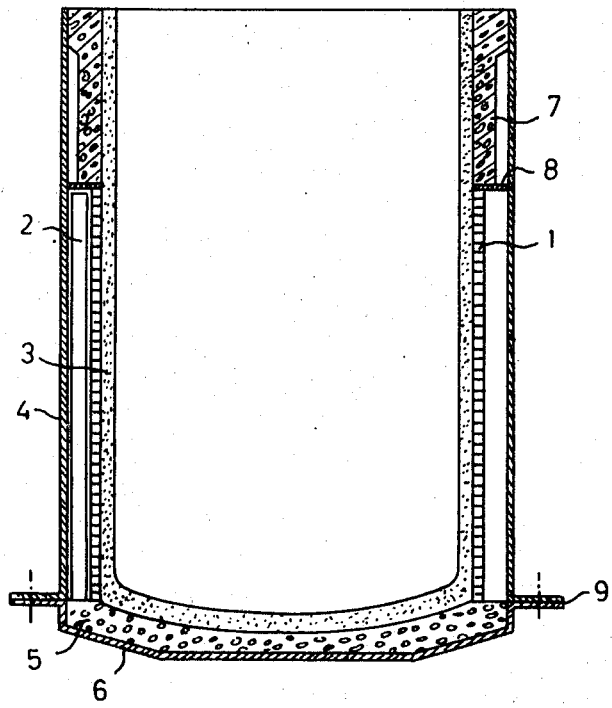

FURNACE AND METHOD OF MAKING SAME

The present invention relates to a furnace and to a method of making such a furnace.

More specifically, an object of the present invention is in a method of manufacturing a furnace wherein a refractory concrete base is prepared in a tank, over which base an induction coil is placed, eventually with magnetic concentrators, after which puddled clay is packed inside the coil to form a crucible.

Furnaces made according to this method have several disadvantages. The refractory concrete of the base in the bottom of the tank cracks during operation of the furnace and must be replaced relatively frequently. When the puddled clay must be removed, the bottom of the tank is difficult to reach so that the work is tedious and slow and there are great chances that the concrete base be damaged more than is necessary. Besides, if the concrete base is removed and replaced by a new one, the required drying time will force shut-down of the furnace for several days.

It is therefore an object of the invention to overcome these difficulties, to make it easier to replace the puddled clay and to appreciably reduce the shut-down period of the furnace.

The manufacturing method of the invention is characterized in that the refractory concrete base is prepared separately in a removable bottom cover, in that the cover is thereafter fixed to the cylindrical wall of the tank, and in that a further removable bottom cover is prepared for replacement purposes.

As to the furnace, it is characterized in that the tank bottom is in the form of a cover separate from the cylindrical wall of the tank and removably fixed to the cylindrical wall. The furnace further includes an extra removable cover and a refractory concrete base thereon to act as replacement parts.

The refractory concrete base of this extra cover is prepared well in advance. The concrete may thus set and dry at ease which improves its thermal and mechanical qualities and decreases the stresses due to a high residual humidity during start-up of the rebuilt furnace. As no drying time for the concrete need be provided, the shut-down period of the furnace is reduced to a minimum.

The removable bottom covers are preferably concave. Such a shape allows a uniform distribution of the thermal and mechanical stresses and lengthens the life of the concrete base.

The invention will now be described with reference to a preferred embodiment illustrated in the appended drawing wherein the single figure is a vertical cross-sectional view of a furnace made according to the invention.

The furnace is made up of an induction coil 1 cooperating with magnetic concentrators 2 and a puddled clay crucible 3. This assembly is surrounded by the cylindrical wall 4 of a tank and rests on a refractory concrete base 5 prepared in a removable bottom cover 6 of the tank. It is topped by bearing tiles 7 mounted on an asbestos ring 8 and is besides covered by a crown (not shown) acting as a seat for a movable cap, not shown.

The removable bottom cover 6 is fixed to the cylindrical part 4 of the tank by means of flanges 9 and screws.

When the worn out puddled clay is replaced, the removable cover 6 is separated from the cylindrical wall 4 which makes not only the bottom of the crucible but also the inside of the cylindrical wall readily accessible. The worn out puddled clay may then be removed easily and if the refractory concrete base 5 is in poor condition, a replacement bottom cover 6, already provided with a new concrete base 5, may be fixed immediately to the cylindrical wall 4 of the tank.

New puddled clay is then packed inside the coil 1 to create a new crucible.

I claim:

1. A method of manufacturing a furnace wherein a refractory concrete base is prepared at the bottom of a cylindrical tank, an induction coil is then placed over said base and thereafter puddled clay is packed inside said coil to form a crucible, said method being characterized in that said refractory concrete base is prepared separately from the wall of said furnace in a removable bottom cover, in that said bottom cover with said refractory concrete base thereon is thereafter fixed to the cylindrical wall of said tank, in that clay is then puddled on said prepared concrete base, and in that a further removable bottom cover is prepared for replacement purposes.

2. In a furnace formed of a cylindrical tank, a refractory concrete base over the bottom of said tank, an induction coil over said base, a puddled clay crucible formed over said base and said coil, the improvement wherein said tank bottom is in the form of a cover, comprising a prepared refractory concrete base, said cover and base being separate from the cylindrical wall of said tank and removably fixed to said cylindrical wall.

3. A furnace as claimed in claim 2, including a further removable cover with a refractory concrete base thereon to act as replacement parts.

4. A furnace as claimed in claim 3, wherein said covers have a concave shape.

5. A furnace as claimed in claim 3, wherein said covers and said cylindrical wall are formed with cooperating flanges and screws to interlock said flanges together.

* * * * *